United States Patent Office.

EMANUEL M. CARPENTER, OF ELKHART, INDIANA.

Letters Patent No. 65,170, dated May 28, 1867.

IMPROVED LINIMENT.

*The Schedule referred to in these Letters Patent and making part of the same.*

TO ALL WHOM IT MAY CONCERN:

Be it known that I, EMANUEL M. CARPENTER, of the town and county of Elkhart, and State of Indiana, have invented a new and improved Liniment for the cure of rheumatism, and other diseases of a kindred nature; and I do hereby declare that the following is a full, clear, and exact description of the ingredients used, and the manner of compounding and applying the same.

My invention relates to a liniment made by a combination of ingredients specifically named in the following formula: Ox gall, one gallon; kerosene oil, one-half gallon; alcohol, one gallon. Mix the ox gall and kerosene oil together first, in the proportions above named; then let the same stand one day, and at the expiration of which time add the alcohol. Shake the mixture well before using, and apply the same to the parts affected, as ordinarily.

Having thus fully described my invention, what I claim therein as new, and desire to secure by Letters Patent, is—

The liniment compounded of the ingredients and for the purpose substantially as herein described.

EMANUEL M. CARPENTER.

Witnesses:
B. TURNORCK,
E. LOCKARD.